INVENTOR
KARL V. ANDERSON

Aug. 4, 1964  K. V. ANDERSON  3,142,996
CAM SHAFT CONSTRUCTION

Filed Dec. 1, 1959  2 Sheets-Sheet 2

INVENTOR
KARL V. ANDERSON
BY
HIS ATTORNEY

United States Patent Office 3,142,996
Patented Aug. 4, 1964

3,142,996
CAM SHAFT CONSTRUCTION
Karl V. Anderson, Corning, N.Y., assignor to Ingersoll-Rand Company, New York, N.Y., a corporation of New Jersey
Filed Dec. 1, 1959, Ser. No. 856,420
8 Claims. (Cl. 74—54)

This invention relates generally to cam shafts, and more particularly to the structure of such cam shafts.

An object of this invention is to provide a composite cam shaft of improved structure, compared to the commonly known cam shaft structures.

Another object of this invention is to provide a novel arrangement for the support of the aforementioned composite cam shaft.

A further object of this invention is to provide a novel arrangement for the assembly and disassembly of the aforementioned composite cam shaft.

Figure 1:
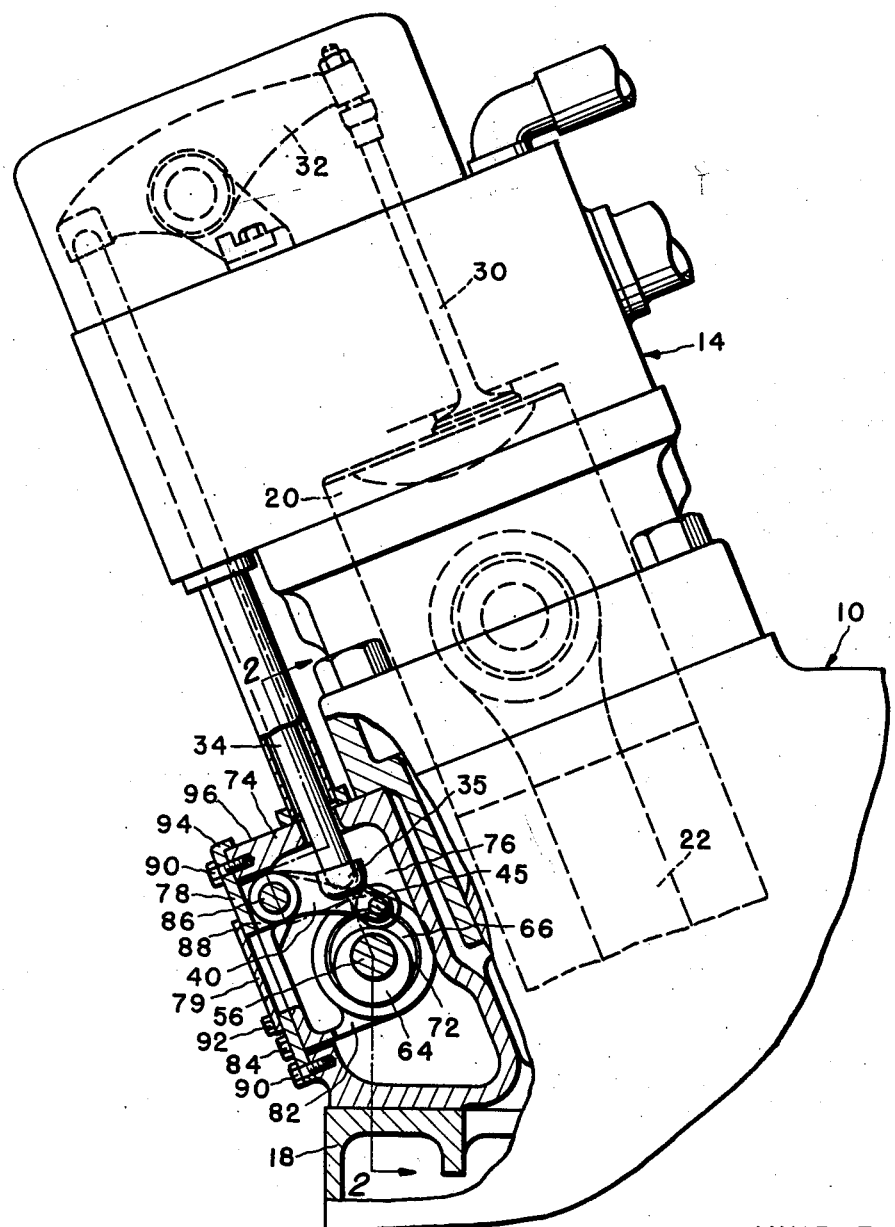
Figure 2:
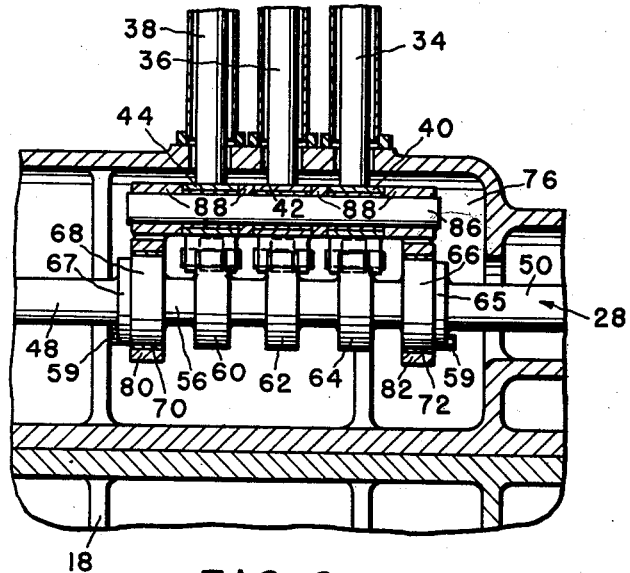
Figure 3:
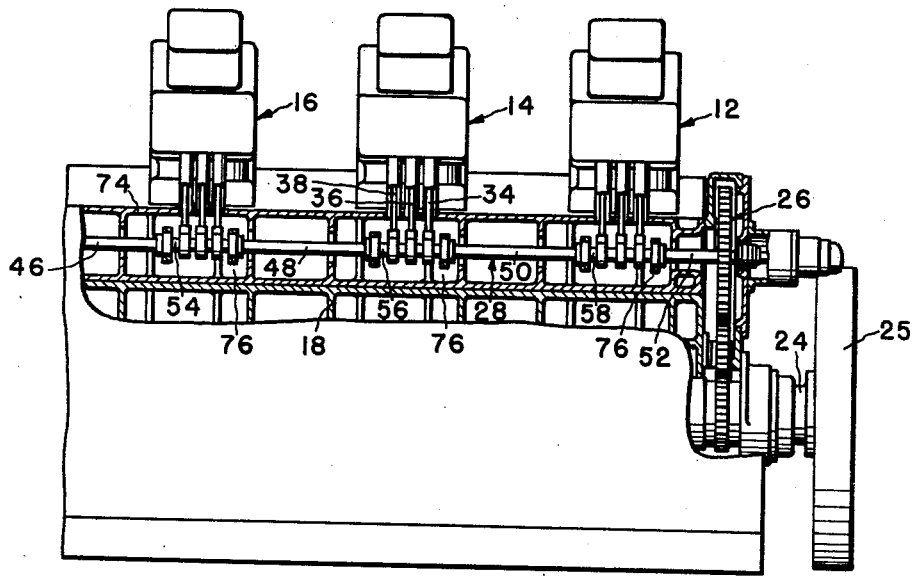

These and other objects and advantages of this invention will appear more fully from the following description made in connection with the accompanying drawings, in which FIGURE 1 is a front view of a part of an internal combustion engine with its cam shaft and associated components in cross section, FIG. 2 is a sectional view along the line 2—2 of FIG. 1 looking in the direction of the arrows, and FIG. 3 is a side view of the internal combustion engine shown in FIG. 1 with the cam shaft and associated components in longitudinal section.

Referring now more particularly to the drawings, a preferred embodiment of the cam shaft structure according to this invention is illustrated as used in an internal combustion engine. The internal combustion engine (partly shown), designated by the numeral 10, is of a multi-cylinder type having cylinders 12, 14 and 16 connected to a frame 18. In each cylinder is disposed a piston 20 connected to a piston rod 22 to rotate a crank shaft 24 and a flywheel 25. Rotation of the crank shaft 24 causes a cam shaft 28 to be rotated by means of a gear arrangement 26.

Each cylinder is provided with an inlet valve 30, an outlet valve (not shown), and fuel control means (not shown), the valves being actuated by rocker arms and rods which transmit motion from the cam shaft 28 to the valves and to the fuel control means (not shown). As shown in FIGS. 2 and 3 the inlet valve 30, the outlet valve (not shown), and the fuel controlling means (not shown) are actuated by rods 34, 38 and 36, respectively. The rods 34, 36 and 38 are supported by cam followers 40, 42 and 44, respectively, the cam followers for transmitting motion from the cam shaft 28 to the rods. Each cam follower carries a roller 45 for engaging the associated cam in a commonly known manner, and a cup shaped receptacle 35 to receive and support the associated rod.

The cam shaft 28 is constructed in sections and comprises connecting sections 46, 48, 50 and 52, and cam sections 54, 56 and 58. The connecting sections having flanged ends 65 and 67, and the cam sections having flanged ends 66 and 68, are connected to each other in end to end relation. One means of connecting the connecting sections and the cam sections is by the use of bolts 59, however, other means well known to those skilled in the art may be used. Each cam section is provided with cams 60, 62 and 64 to actuate the outlet valve (not shown), the fuel controlling means (not shown), and the inlet valve 30, respectively.

A member 74, such as housing, supported by the frame 18 of the engine 10, encloses the entire cam shaft with its associated components, the member or housing 74 being divided into compartments 76 such that each compartment encloses a cam section of the cam shaft 28 with its associated components and a portion of the associated rods.

According to this invention a novel arrangement is provided for the support of the cam shaft 28, as well as for the assembly and disassembly of each cam section of the cam shaft 28. Accordingly, there is provided a support element such as cover plate 78 for each compartment 76, including an auxiliary cover plate 79 to permit inspection of the components within the compartment, the support element 78 such as cover plate serving to support the associated cam section and cam followers. Each cam section, such as cam section 56, and its associated cam followers 40, 42 and 44, are connected to and supported by the cover plate 78. The support of the cam section 56 is achieved by brackets 80 and 82, one end of each bracket connected to the support elements 78 (hereinafter referred to as the cover plate); by bolts 84, while the other end of each bracket supports the bearings 70 and 72 and the flanged ends 68 and 66, respectively, of the cam section 56. As for the cam followers 40, 42 and 44, these are pivotably connected to a common shaft 86, the shaft 86 being supported by brackets 88, also connected to the cover plate 78. In the preferred embodiment the cover plates 78 are connected to the housing by bolts 90, however, it will be understood that other forms of the invention may provide a member to which the cover plate is connected. The auxiliary cover plates 97 are connected to the cover plates 78.

With this arrangement then it is made possible to interchange the various cam shaft cam sections 54, 56, and 58 as a unit, as well as to disassemble any one of the cam sections of the cam shaft 28, such as the cam section 56, from its associated cylinder and to remove the cam section with its associated cam followers as a unit with the cover plate 78.

In order to withdraw a cam section, such as cam section 56, and its associated cam followers as a unit with the cover plate, the cam section 56 is first disconnected from the connecting sections 48 and 50 by loosening the bolts 59 to permit the cam section 56 to be removed from between the connecting sections 48 and 50 without disturbing these connecting sections. The rods 34, 36 and 38 are then disengaged from their associated receptacles 35 on the cam followers whereafter the bolts 90, connecting the cover plate 78 to the housing 74, are loosened to permit the cover plate 78 and the cam section 56 with its associated cam followers to be removed as a unit from the housing 74.

It is to be noted that each cover plate 78 is or may be provided with a flange 94 which is supported by the upper end 96 of the housing 74 to hold the cover plate 78 against downward movement caused by the forces exerted on the associated cam followers. It is also to be noted that all contacting surfaces between the cover plate 78 and the housing 74, including the contacting surfaces between the flanges 94 and the upper end 96 of the housing 74, are machined. These arrangements are made to insure an accurate positioning of the cover plates relative to the housing to properly align the cam sections and the connecting sections, relative to each other, along the entire length of the cam shaft.

While I have shown and described a specific form of my invention, it is to be understood that various changes and modifications may be made without departing from the spirit of the invention as set forth in the appended claims.

I claim:

1. A cam assembly for mounting within a frame comprising:

(a) a shaft including shaft sections and a cam section, (1) said cam section having at least one cam thereon, (b) means connecting said cam section to said shaft sections, (c) cover plate support means removably connected to the outside of said frame rotatably supporting said cam section within said frame and aligning said cam section with said shaft sections, and (d) a cam follower pivotably connected to said cover plate support means and operatively cooperating with said cam, (1) said cover plate support means, cam section and cam follower being removable as a unit from said frame.

2. In combination:

(a) a frame, (b) a cam shaft including shaft sections and cam sections, (1) said cam sections having at least one cam on each cam section, (c) means connecting said cam section to said shaft sections, (d) cover plate support means supporting each cam section and being removably connected to the outside of said frame, (1) each of said cover plate support means comprising a plate connectable to the outside of said frame and a plurality of brackets connected at one end to each of said cover plate support means and their other ends rotatably supporting an associated cam section within said frame, and (e) at least one cam follower pivotably connected to each of said cover plate support means and operatively cooperating with its associated cam, (1) said cover plate support means, cam section and follower being removable as a unit from said frame.

3. The combination of claim 2 in which said cover plate support means includes a cam follower support means.

4. The combination claimed in claim 2 in which a cam follower support is provided for each cam section and each cam follower includes an arm hingedly connected to said cover plate support means.

5. The combination claimed in claim 4 in which there is included a push rod positioned to be actuated by said cam follower, and a receptacle connected to said arm adapted to receive and engage said push rod.

6. A mounting for a shaft housed within a frame comprising:

(a) shaft sections and cam sections connected in end to end relation and in axial alignment with each other, (1) said cam sections having cams thereon, (b) a plurality of cover plate support means removably connected to the outside of said frame supporting said cam sections within said frame along the longitudinal axis of said shaft and aligning said cam sections and said shaft sections, (1) each of said cover plate support means and said cam sections being assembled as a unit, and (c) means connecting said cam section to said shaft sections and maintaining said cam sections and said shaft sections in alignment.

7. A mounting for a cam shaft within a frame comprising:

(a) a shaft having shaft sections and cam sections in end to end relation and in axial alignment, (b) means connecting said cam sections to said shaft sections, (c) a cover plate support means connected to the outside of said frame rotatably supporting said cam sections within said frame and initially aligning said cam sections and said shaft sections, and (d) at least one cam follower pivotably mounted on said cover plate support means for each cam section positioned to be actuated by its associated cam section, (1) said cover plate support means including a common support for each of said cam sections and its associated cam follower, each common support positioned such to hold each cam section in axial alignment with said shaft sections and to permit assembly of any one of said cam sections and its associated cam follower as a unit or assembly of said cam shaft without alignment of the last cam section with the other cam sections and with the shaft sections.

8. A mounting for a cam shaft within a compartmented frame comprising:

(a) a cam shaft including cam sections and shaft sections connected alternately in end to end relation and in axial alignment, (1) each of said cam sections having at least one cam mounted thereon, (2) each cam section being in its own compartment, (b) a cam follower for each cam positioned to be actuated by the associated cam, (c) a cover plate for each compartment forming a cover plate support means connected to the outside of said frame, (1) said cover plate support means supporting each of said cam sections and its associated cam follower to permit removal of said cover plate with its associated cam section and cam follower as a unit, and (d) means connected to said cam sections and said shaft sections to connect each of said cam sections alternately to said shaft sections, (1) each of said cover plates being connected to its associated compartment such that the sections of said cam shaft are maintained in a fixed position and in axial alignment relative to each other to permit reassembly of the cam shaft without realignment of the sections of the cam shaft by merely connecting the cover plates to the outside of the frame and to their corresponding compartments.

References Cited in the file of this patent

UNITED STATES PATENTS

| | | |
|---|---|---|
| 995,436 | Bolthoff | June 20, 1911 |
| 1,651,465 | Nelson | Dec. 6, 1927 |
| 1,751,625 | Fisher | March 25, 1930 |
| 2,323,209 | Essl | June 29, 1943 |
| 2,379,545 | Silva et al. | July 3, 1945 |
| 2,484,926 | Bennett et al. | Oct. 18, 1949 |
| 2,552,724 | Lang | May 15, 1951 |

FOREIGN PATENTS

| | | |
|---|---|---|
| 46,750 | Switzerland | Apr. 14, 1909 |